US011390010B2

(12) United States Patent
Buess (10) Patent No.: US 11,390,010 B2
(45) Date of Patent: Jul. 19, 2022

(54) APPARATUS AND METHOD FOR FORMING PLASTIC PREFORMS INTO PLASTIC CONTAINERS WITH LOAD COMPENSATION FOR MEDIA CONNECTIONS

(71) Applicant: KRONES AG, Neutraubling (DE)

(72) Inventor: Armin Buess, Regensburg (DE)

(73) Assignee: KRONES AG

( * ) Notice: Subject to any disclaimer, the term of this patent is extended or adjusted under 35 U.S.C. 154(b) by 0 days.

(21) Appl. No.: 17/281,213

(22) PCT Filed: Sep. 27, 2019

(86) PCT No.: PCT/EP2019/076197
§ 371 (c)(1),
(2) Date: Mar. 29, 2021

(87) PCT Pub. No.: WO2020/065018
PCT Pub. Date: Apr. 2, 2020

(65) Prior Publication Data
US 2021/0394422 A1 Dec. 23, 2021

(30) Foreign Application Priority Data

Sep. 27, 2018 (DE) ...................... 10 2018 123 876.2

(51) Int. Cl.
*B29C 49/36* (2006.01)
*B29C 49/56* (2006.01)
(Continued)

(52) U.S. Cl.
CPC .............. *B29C 49/36* (2013.01); *B29C 49/56* (2013.01); *B29C 2049/566* (2013.01); *B29C 2049/5858* (2013.01); *B29L 2031/7158* (2013.01)

(58) Field of Classification Search
CPC ... B29C 49/56; B29C 2049/566; B29C 49/36; B29C 2049/5858
See application file for complete search history.

(56) References Cited

U.S. PATENT DOCUMENTS

| 9,061,458 B2 | 6/2015 | Chomel et al. ..... B29C 49/4802 |
| 2011/0298162 A1 | 12/2011 | Chomel et al. ............... 264/531 |

(Continued)

FOREIGN PATENT DOCUMENTS

| DE | 20 2015 101 602 | 5/2015 | ............. B29C 49/42 |
| DE | 10 2013 113 361 | 6/2015 | ............. B29C 49/28 |
| DE | 10 2015 117 292 | 4/2017 | ............. B29C 49/42 |

OTHER PUBLICATIONS

German Search Report issued in German Patent Appln. Serial No. 10 2018 123 876.2, dated Jun. 17, 2019, with machine English translation, 14 pages.

(Continued)

*Primary Examiner* — Robert B Davis
(74) *Attorney, Agent, or Firm* — Hayes Soloway P.C.

(57) ABSTRACT

An apparatus for forming plastic preforms into plastic containers has at least one supply device with at least one first connecting line, wherein at least one section of at least one connecting line is arranged stationary relative to a main carrier by at least one fastening device, and wherein a section of this connecting line is arranged on a device of the forming device in such a way that, in the event of a movement of the side part carrier relative to the main carrier, this section of the connecting line moves relative to the fastening device. An actuator is arranged on the apparatus, to which at least a section of the connecting line is fastened, wherein this actuator also being movable relative to the main carrier.

20 Claims, 4 Drawing Sheets

(51) Int. Cl.
 *B29C 49/58* (2006.01)
 *B29L 31/00* (2006.01)

(56) References Cited

U.S. PATENT DOCUMENTS

2012/0251648 A1* 10/2012 Duclos .................... B29C 49/56
 425/150
2013/0207319 A1* 8/2013 Haesendonckx ....... B29C 49/56
 264/530

OTHER PUBLICATIONS

International Preliminary Report on Patentability issued in PCT/EP2019/076197, dated Mar. 23, 2021, 6 pages.
International Search Report and Written Opinion issued in PCT/EP2019/076197, dated Jan. 1, 2020, with English translation, 14 pages.

* cited by examiner

APPARATUS AND METHOD FOR FORMING PLASTIC PREFORMS INTO PLASTIC CONTAINERS WITH LOAD COMPENSATION FOR MEDIA CONNECTIONS

BACKGROUND OF THE INVENTION

The present invention relates to an apparatus and a method for forming plastic preforms into plastic containers. Such apparatus and methods have been known in the prior art for a long time. In this process, heated plastic preforms are usually expanded within blow moulds to form plastic containers, such as in particular plastic bottles. This can be done with gaseous media, such as in particular compressed air, but recently processes have also become known in which this expansion is carried out directly with a liquid medium and in particular with, for example, a beverage to be filled. The present invention is directed to both embodiments.

Usually, such forming stations have blow mould carriers on which blow mould parts are arranged directly or indirectly. Sometimes it is necessary to supply these blow mould parts or other components of the forming stations, such as blow mould carrier shells or even the blow mould carriers themselves, for example with electrical energy, but also in particular with temperature control media. Cables and lines are usually used for this purpose. When opening and closing these blow moulds, the blow mould carriers are usually swivelled. This can lead to increased stress on these cable connections, which is disadvantageous in that these connections are often expensive and are therefore replaced relatively quickly.

In particular, for the temperature control of the mould carrier or the blow-moulded parts of such a blowing or forming station, a temperature control medium flows through them. Due to the required movement of the mould carrier, it must therefore be supplied with the temperature control medium via a flexible hose line. According to the current state of the art, these hose lines are permanently installed on one side, i.e. one side of the hose is connected to a distributor and the other side to the moving mould carrier.

As mentioned above, this results in torsion and the like of these hoses during an opening and closing movement and thus in a high load.

The present invention is therefore further based on the task of reducing such loads and, in particular, increasing the service life of such connecting lines in this way.

SUMMARY OF THE INVENTION

An apparatus according to the invention for forming plastic preforms into plastic containers has a forming device with a first side part carrier and a second side part carrier. A first side part of a blow mould is fastened at least indirectly at the first side part carrier and a second side part of a blow mould is fastened at least indirectly at the second side part carrier, wherein these side parts form at least a part of the cavity in a closed state of the blow mould, within which the plastic preform can be formed into the plastic container by the application of a flowable medium, and wherein the forming device is arranged on a main carrier on which at least one side part carrier is arranged movably relative to the other side part carrier for opening and/or closing the blow mould.

In this case, the forming device has at least one supply device with at least one first connecting line, wherein at least one section of at least one connecting line is arranged stationary relative to the main carrier by means of a fastening device and wherein a section of this connecting line is arranged on a device of the forming device in such a way that, when the side part carrier moves relative to the main carrier, this section of the connecting line moves relative to the fastening device.

According to the invention, the apparatus has an actuator to which at least one section and, in particular, a further section of the connecting line is attached, wherein this actuator also being movable relative to the main carrier.

In particular, this further section of the connecting line is spaced apart from the section arranged on the device of the forming device and/or the section arranged on the fastening device. In particular, this section is located between the section located on the forming device and the section located on the fastening device.

In a further advantageous embodiment, the blow mould also has a bottom part. Particularly preferably, the two side parts together with this bottom part form the cavity for expanding the plastic preforms into the plastic containers. Furthermore, a device can be provided which closes the blow mould by feeding the bottom part to it.

The invention therefore proposes that relief of this connecting line is effected by also moving a section to which the connecting line is attached (in particular coupled to the movement of the side part carrier) so as to prevent excessive twisting or bending of the connecting line.

In a further advantageous embodiment, the apparatus has a rod-like body and, in particular, a stretching rod which can be inserted into the plastic preforms for stretching them.

In a further advantageous embodiment, the apparatus also has a stressing device which acts upon the plastic preform with the flowable medium. As mentioned above, this stressing device can be a so-called blow nozzle, which can be placed on a mouth edge of the plastic preforms and acts upon them with the flowable medium. This stressing device can act upon the plastic preforms with a gaseous medium as well as with a liquid medium and in particular a beverage to be filled.

In a further advantageous embodiment, it is possible that the side parts of the blow moulding device are arranged directly on the side part carriers, but it would also be possible for other elements to be provided. For example, blow mould shells can be arranged on the side part carriers and the blow mould side parts can in turn be arranged on these blow mould shells.

In a further preferred embodiment, the movement of the at least one side part carrier is a pivoting movement and in particular a pivoting movement with respect to an axis which is parallel to the longitudinal direction of the plastic preform to be formed. Particularly preferably, the second side part carrier is also pivoted. This can be a symmetrical swivelling process, so that both side part carriers are swivelled equally and also at the same speed.

By an arrangement of the connecting line on at least one device of the forming device it is understood that it can be arranged, for example, on the side part carrier. For this purpose, the conduit device may have corresponding coupling devices. However, it would also be possible for the connecting line to extend in sections through the side part carrier in order to directly supply elements arranged inside the side part carrier, such as in particular the side parts of the blow mould, for example to temper them with the tempering medium.

In a further advantageous embodiment, that portion which is arranged on the device of the forming device is an end portion of the connecting line.

A supply to the forming station is understood to mean in particular the supply of the forming station with a flowable, for example liquid medium. However, it could also be the supply of the forming station with electrical energy, for example when the blow-moulded parts are electrically tempered, for example heated.

It is therefore proposed that the line sections connected to a stationary distributor in the prior art are only connected to a distributor which is coupled in particular to the side part carriers, wherein this distributor, hereinafter referred to as actuator —preferably synchronously—moves with the opening and closing movement of the mould carrier. This actuator or distributor block is preferably supplied with an additional hose. This is explained in more detail below.

Particularly preferably, the movement of the actuator is coupled to the movement of at least one side part carrier and preferably both side part carrier.

In a further preferred embodiment, a drive is provided for opening and closing the blow mould. This can be, for example, an electric drive or also a pneumatic or hydraulic drive, but it would also be conceivable and preferred that guide cams are used to carry out the opening and closing movement.

In a further advantageous embodiment, the connecting line is a media line and in particular a liquid line. Particularly preferably, these media lines serve to conduct a liquid or gaseous medium, for example water or oil. In particular, the supply device serves to temper elements of the forming device and in particular of the blow mould side parts.

Preferably, the media lines are hoses.

In a further advantageous embodiment, at least one connecting line is a flexible connecting line. Preferably, an end section of this connecting line opens into the side part carriers of the blow mould.

In a further advantageous embodiment, a movement of the actuator relative to the main carrier is coupled to a movement of at least one side part carrier relative to the main carrier. In particular, a mechanical coupling takes place. For example, a movement of the side part carrier can also set a slide in motion, which in turn carries the actuator.

In this way, the complex and awkward movement of the hoses is divided into at least two sections.

In a further preferred embodiment, the movement of the actuator is coupled to the movement of the side part carrier in such a way that this movement counteracts a change in distance between the side part carrier and the actuator. In particular, this is a change in distance between the end sections of the respective connecting line.

In a further advantageous embodiment, at least one connecting line has a first connecting line section and at least one second connecting line section, wherein the first connecting line section and the second connecting line section being in flow communication with one another. It is possible that these connecting line sections are coupled to each other, for example via couplings. Particularly preferably, however, this flow connection is established by the actuator.

In a preferred embodiment, the actuator is movable in a rectilinear direction. Preferably, as explained in more detail below, a slide is provided that supports the actuator or is mechanically coupled to it. It is possible that the actuator is moved by the same drive device that also causes a movement of the side part carriers.

Particularly preferably, this rectilinear movement may also be substantially perpendicular to an axis of the plastic preform. However, it would also be possible for the movement to be oblique with respect to the axis of the plastic preform, for example with respect to a perpendicular direction with respect to the longitudinal direction of the plastic preform, by less than 30°, preferably by less than 20° and preferably by less than 10°.

In a further advantageous embodiment, the blow mould carrier parts are symmetrically movable.

In a further advantageous embodiment, the actuator can be moved in a plane of symmetry which, in a closed state of the blow mould, is formed by the two adjoining side parts of the blow mould. In this way, an equivalent relief can be achieved for both blow mould carrier parts. By using several connecting sections of the line connections, the complex and awkward hose movement of the original hose is divided to two hoses. These hoses then have to perform a considerably smaller movement. However, this is only a very slight movement and torsions can preferably be avoided completely.

The hose or hoses can thus be made from a significantly cheaper hose material. In this way, a cost saving can also be achieved for the connecting lines. Overall, a cost advantage is achieved here despite the increase in the number of hoses.

In a further advantageous embodiment, the actuator is also designed as a fluid distribution device. Thus, the actuator can have a distribution chamber which, for example, distributes the liquid from an incoming line section to two outgoing line sections. This applies in particular to the forward flow of a temperature control system for the blow moulds. Correspondingly, for the return flow, the actuator can also act as a distributor device or as a collecting device, which collects the return flow from two second line sections and feeds it to a first line section.

The present invention is further directed to an arrangement for forming plastic preforms into plastic containers, comprising a movable and in particular rotatable central carrier to which a plurality of devices of the claims described above are attached. In particular, the arrangement is of the rotary type.

In a preferred embodiment, the arrangement has a feed device and, in particular, a feed starwheel in order to feed the plastic preforms to the respective forming stations. In a further advantageous embodiment, the arrangement also has a discharge device and, in particular, a discharge starwheel in order to discharge the manufactured and, in particular, blown and/or already filled containers from the forming stations.

The present invention is further directed to a method for forming plastic preforms into plastic containers by means of a forming device which comprises a first side part carrier and a second side part carrier, wherein a first side part of a blow mould is at least indirectly fastened or will be fastened to the first side part carrier and a second side part of the blow mould is at least indirectly fastened or will be fastened to the second side part carrier, and wherein these side parts form at least a part of a cavity in a closed state of the blow mould, within which cavity the plastic preform is formed into the plastic container by the application of a flowable medium and wherein the forming device is arranged on a main carrier on which at least one side part carrier is moved relative to the other side part carrier to open and/or close the blow mould, wherein at least one element of the forming device is supplied by means of a supply device and which comprises at least one first connecting line, wherein at least a section of at least one connecting line is arranged stationary relative to the main carrier by means of at least one fastening device and wherein a section of this connecting line is arranged on a device of the forming device in such a way that, when the side part carrier is moved relative to the main carrier, this section of the connecting line moves relative to the fastening device and/or the main carrier.

According to the invention, the device comprises an actuator to which at least a section of the connecting line is attached, wherein this actuator also moves relative to the main carrier when the blow mould is opened and/or closed.

Therefore, a procedure is also proposed on the process side, which ultimately leads to the relief of the respective connecting lines, in particular hoses.

Preferably, the plastic preforms are expanded by means of a flowable medium and in particular by means of air and/or a liquid.

Further advantages and embodiments are apparent from the attached drawings.

DETAILED DESCRIPTION OF THE INVENTION

Figure 1A:
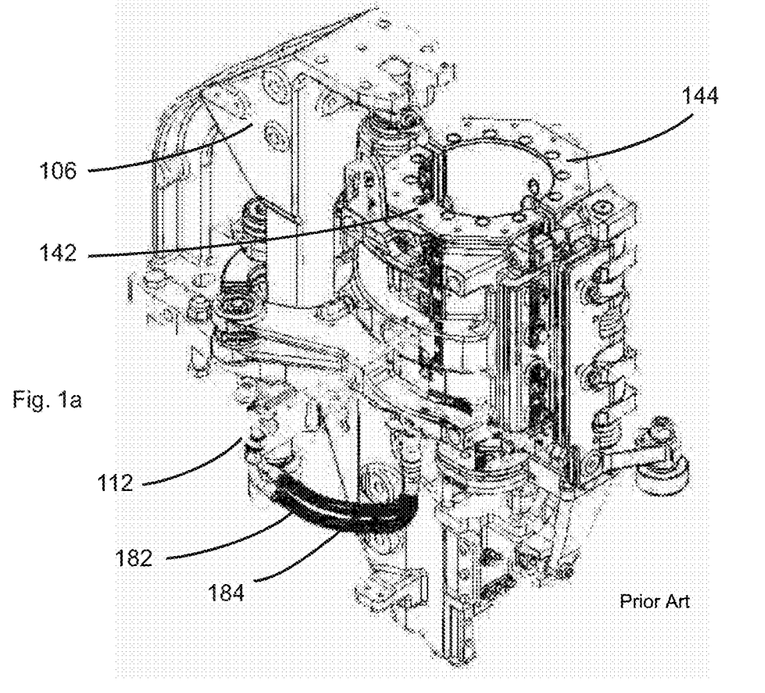
FIG. 1a shows an illustration of a forming station according to the internal prior art of the applicant in a closed state.

FIG. 1a shows a forming device according to the internal prior art of the applicant in a closed state. It comprises a first side part carrier 142 and a second side part carrier 144. These two side part carriers 142 and 144 are pivotally arranged relative to a main carrier 106. The reference sign 112 indicates a fastening device by means of which two hose lines 182 and 184 are fastened to the main carrier. The second ends of these hose lines open here in a region of the side part carrier 142.

Figure 1B:
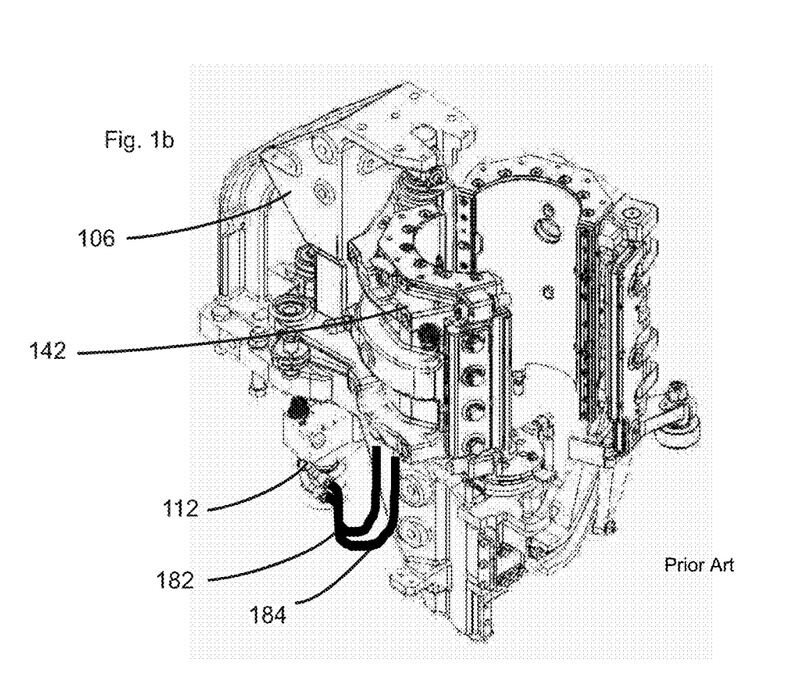
FIG. 1b shows the forming device from FIG. 1a in an opened state.

FIG. 1b shows the forming device shown in FIG. 1a in an opened state. It can be seen that here the side part carriers here move significantly closer to the fastening device 112 and in this way the hose lines 182, 184 are curved significantly more and are thus subjected to significantly greater stress.

Figure 2A:
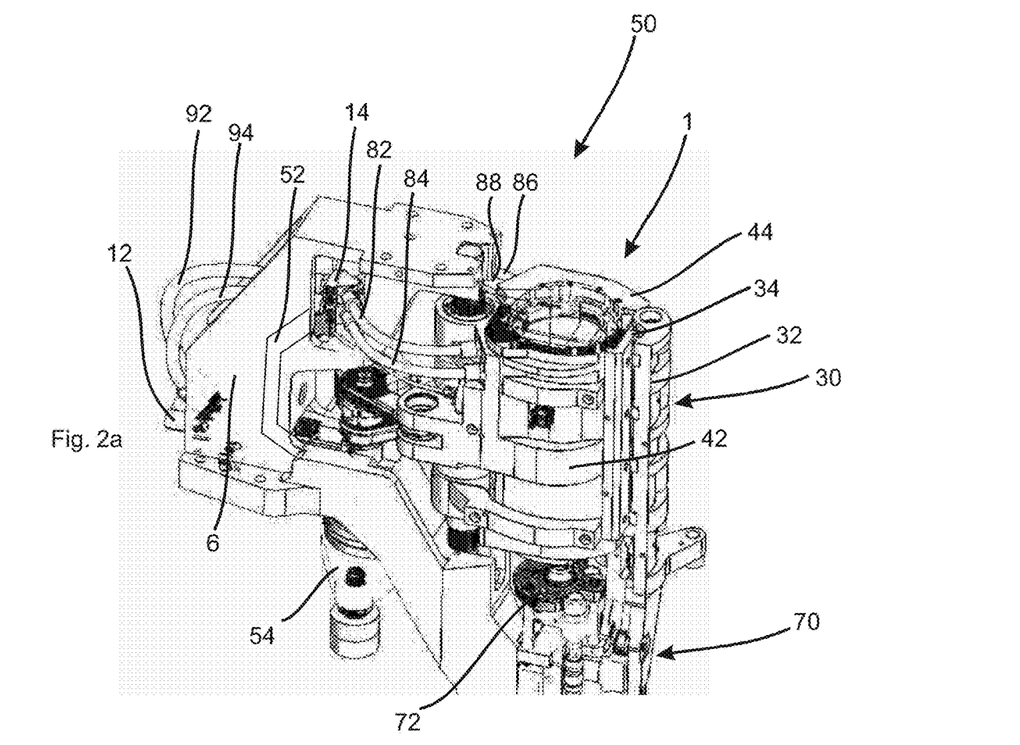
FIG. 2a shows an illustration of a forming device according to the invention in a closed state of the blow mould or forming device.

FIG. 2a shows a forming device according to the invention in a closed state. Here, the reference sign 42 refers to a first side part carrier and the reference sign 44 refers to a second side part carrier. These side part carrier can be pivoted by means of a shaft to open and close the blow mould (not shown). The reference sign 30 indicates a locking device by means of which the side part carriers can be locked.

The reference sign 72 indicates a bottom part carrier by means of which a bottom part (not shown) can also be brought to the two side parts in order to close the blow mould. The reference sign 70 indicates a coupling mechanism by means of which the movement of the bottom part carrier 72 is coupled to the movement of the side part carriers.

The reference sign 54 indicates a drive device, here a cam roller, by means of which (with guide cams) opening and closing of the blow moulds can be achieved.

The reference sign 12 indicates a fastening device which is arranged on the main carrier 6. Starting from this fastening device, two first connecting line sections 92 and 94 lead to an actuator 14. Starting from this actuator 14, two connecting line sections 82 and 84 in turn lead further to the blow mould carrier part 42 and two further connecting line sections 86 and 88 lead to the second side part carrier 44. The reference sign 1 identifies the forming device and the reference sign 50 identifies the forming apparatus.

Figure 2B:
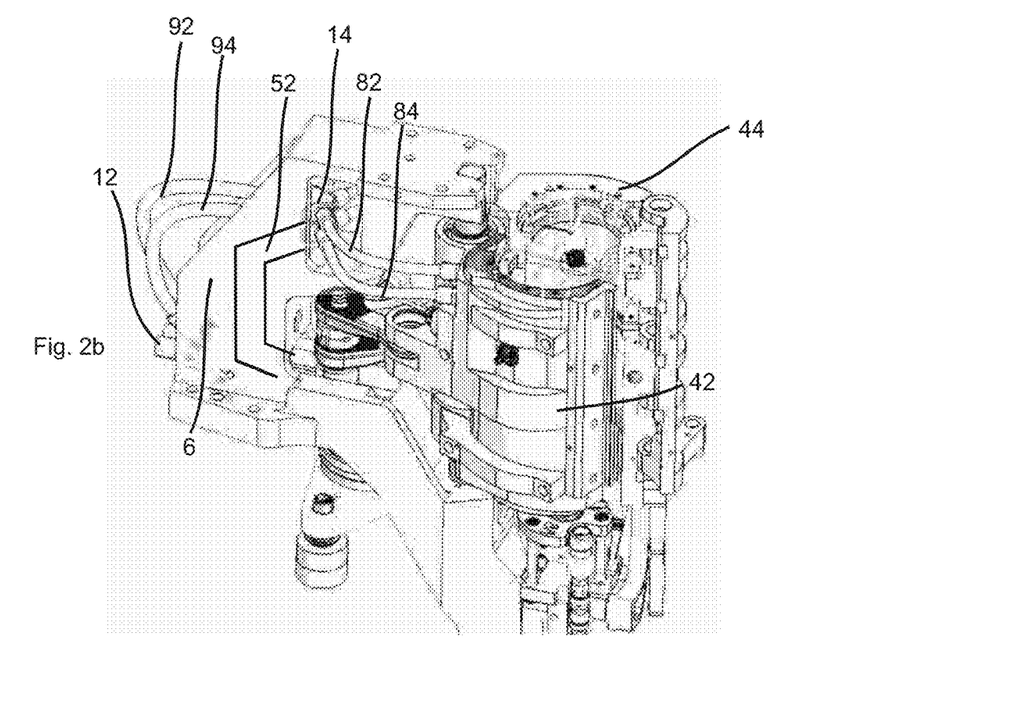
FIG. 2b shows the device from FIG. 2a in an opened state of the blow mould or forming device.

FIG. 2b shows the forming device shown in FIG. 1 in an opened state. It can be seen that here the connecting line sections 82 and 84 are not significantly more curved than in the situation shown in FIG. 2a, as the actuator 14 has also moved backwards with the opening movement here compared to FIG. 2.

The reference sign 52 indicates an actuator carrier, which in turn is arranged on a slide, the movement of which is mechanically coupled to the guide roller.

Figure 3A:
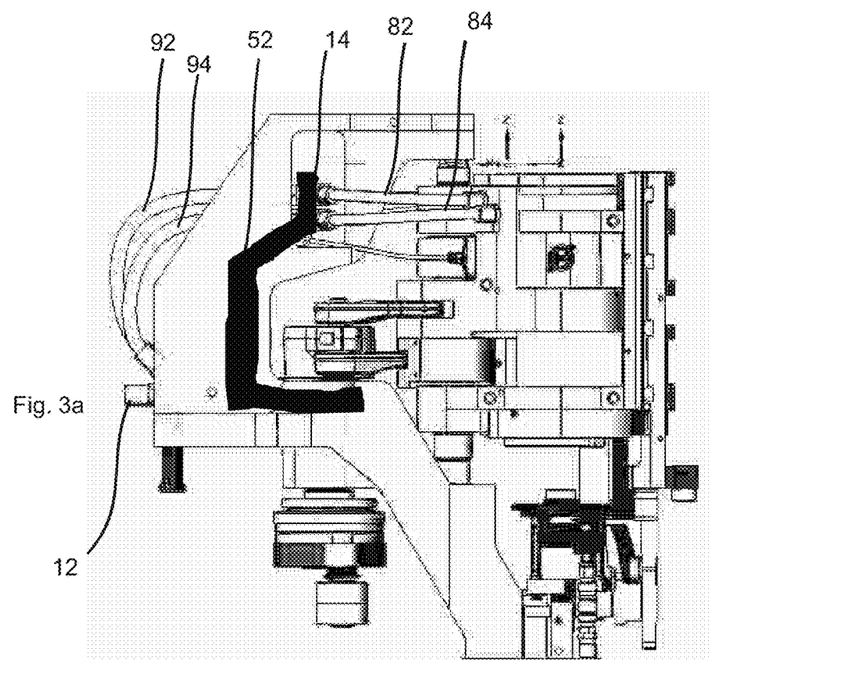
FIG. 3a shows a side view of the forming device in a closed state of the blow mould.
Figure 3B:
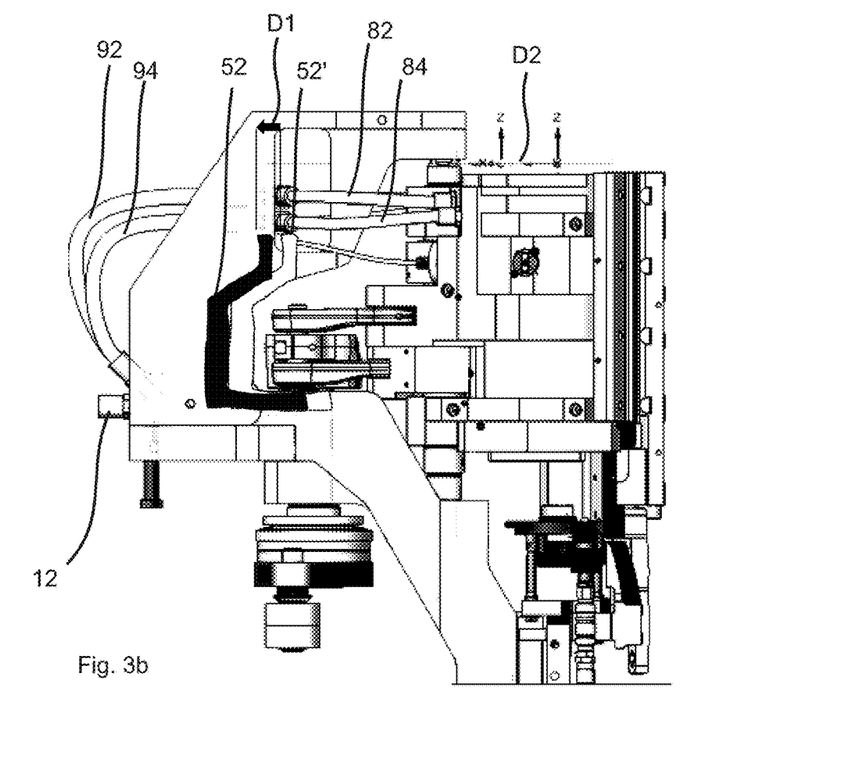
FIG. 3b shows a side view of the forming device in an opened state of the blow mould.

FIGS. 3a and 3b show a side view of the forming device shown in FIGS. 2a and 2b. In particular, the slide 52 is shown in this illustration, which (cf. FIG. 3) is arranged in two different positions. As mentioned above, the actuator 14 is also arranged on this slide. The reference sign 52' accordingly indicates the position of the carrier 52 in the situation shown in FIG. 3a.

Figure 4A:
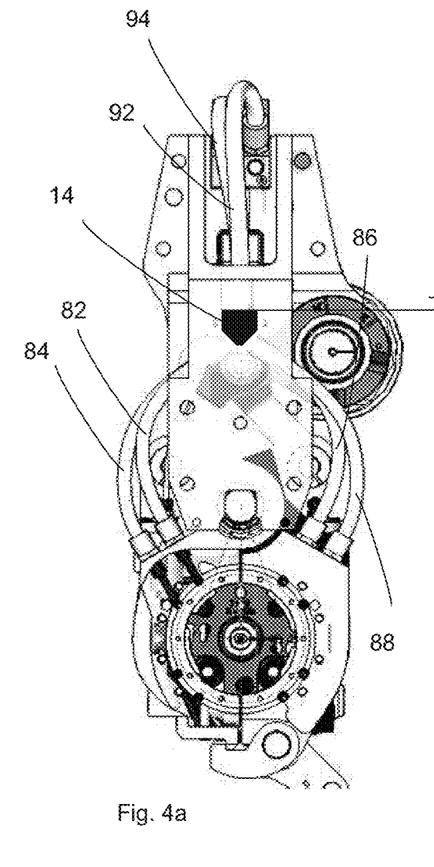
FIG. 4a shows a view from below of a forming device according to the invention in a closed state of the blow mould.
Figure 4B:
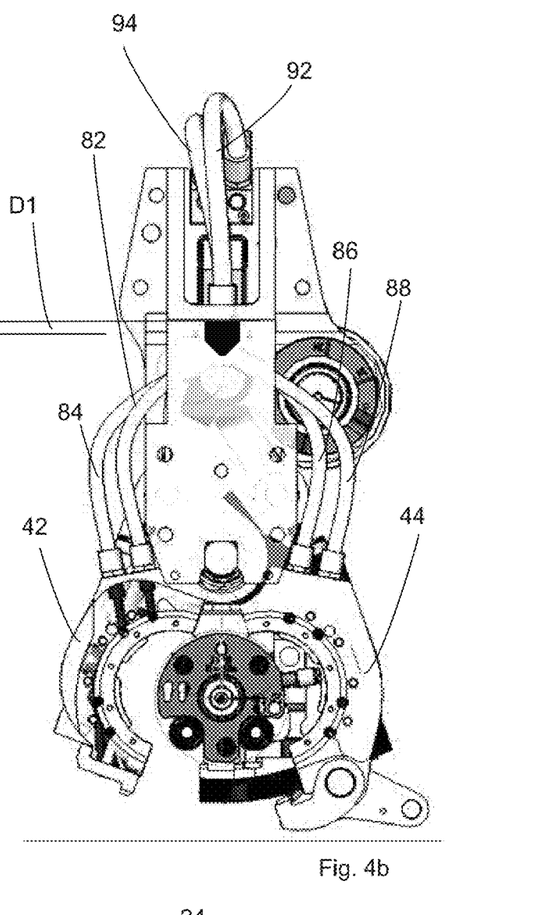
FIG. 4b shows the illustration from FIG. 4a in an opened state of the blow mould.

FIGS. 4a and 4b show a top view of the forming device according to the invention. Here, in particular, the distance D1 along which the actuator 14 is moved is again visible.

As mentioned above, the actuator also serves to distribute liquids to the two side part carriers 42 and 44. Accordingly, the actuator 14 has a cavity in its interior in which liquid can be collected and/or distributed.

Figure 5:
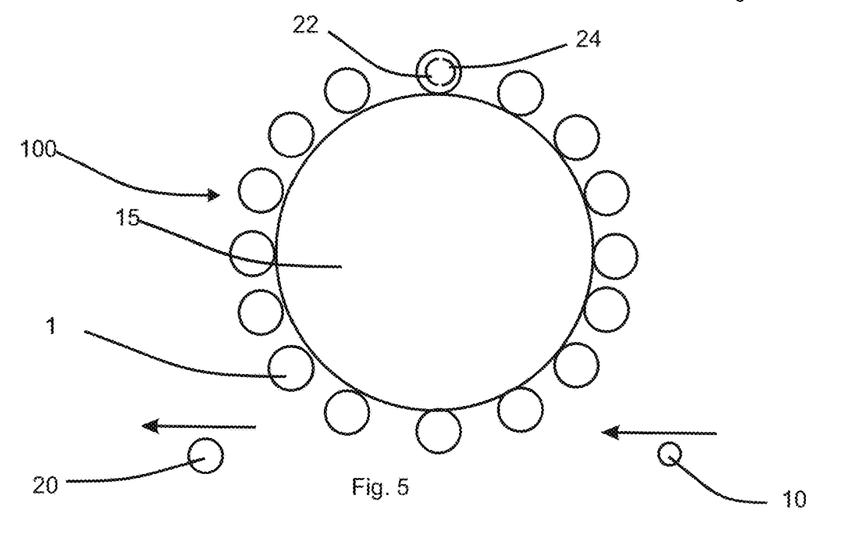
FIG. 5 shows a schematic representation of an arrangement for forming plastic preforms into plastic containers.

FIG. 5 shows a schematic representation of an arrangement according to the invention for forming plastic preforms 10 into plastic containers 20. This has a station carrier 15 on which a plurality of forming stations 1 and in particular forming stations 1 according to the invention are arranged. The reference signs 22 and 24 roughly schematically indicate the side parts of a blow mould 2.

The applicant reserves the right to claim all features disclosed in the application documents as essential to the invention, provided they are individually or in combination new compared to the prior art. It is further pointed out that the individual figures also describe features which may be advantageous in themselves. The skilled person immediately recognises that a certain feature described in a figure can also be advantageous without adopting further features from this figure. Furthermore, the skilled person recognises that advantages can also result from a combination of several features shown in individual figures or in different figures.

LIST OF REFERENCE SIGNS 1 forming device
2 blow mould
6 main carrier
10 plastic preforms 12 fastening device
14 actuator
15 station carriers
20 plastic containers
22 side part of a blow mould
24 side part of a blow mould
30 locking device
42 blow mould carrier part
42 first side part carrier
44 second side part carrier
50 forming apparatus
52 actuator carrier, slide
52' position of the carrier
53 guide roller
54 drive unit
70 coupling mechanism
72 side part of a blow mould
82 line section
84 line section
86 connecting line section
88 connecting line section
92 first line section
94 first line section
106 main carrier (state of the art)
112 fastening device (state of the art)
142 first side part carrier (state of the art)
144 second side part carrier (state of the art)
182 hose line (state of the art)
184 hose line (state of the art)

The invention claimed is:

1. An apparatus for forming plastic preforms into plastic containers, having a forming device with a first side part carrier and a second side part carrier, wherein a first side part of a blow mould is fastened at least indirectly at the first side part carrier and a second side part of the blow mould is fastened at least indirectly at the second side-part carrier, wherein the first and second side parts in a closed state of the blow mould form at least a part of a cavity within which the plastic preform can be formed into the plastic container by the application of a flowable medium, and wherein the forming device is arranged on a main carrier, on which at least one side part carrier is arranged movably relative to the other side part carrier for opening and/or closing the blow mould, wherein the forming device has at least one supply device with at least one first connecting line, wherein at least one section of at least one connecting line is arranged stationary with respect to the main carrier by at least one fastening device and wherein a section of this connecting line being arranged on a device of the forming device in such a way that, in the event of a movement of the side part carrier with respect to the main carrier, this section of the connecting line moves with respect to the fastening device, wherein
an actuator is arranged on the apparatus, to which at least one section of the connecting line is fastened, wherein the actuator also being movable relative to the main carrier.

2. The apparatus according to claim 1, wherein
the connection line is a media line.

3. The apparatus according to claim 1, wherein
the at least one connection line is a flexible connection line.

4. The apparatus according to claim 1, wherein
a movement of the actuator relative to the main carrier is coupled to a movement of at least one side part carrier relative to the main carrier.

5. The apparatus according to claim 4, wherein
the movement of the actuator is coupled to the movement of the side part carrier in such a way that said movement counteracts a change in distance between the side part carrier and the actuator.

6. The apparatus according to claim 1, wherein
at least one connecting line comprises a first connecting line section and a second connecting line section, wherein the first connecting line section and the second connecting line section being in flow communication with each other.

7. The apparatus according to claim 1, wherein
the actuator is movable in a rectilinear direction.

8. The apparatus according to claim 1, wherein
the actuator is also designed as a liquid distribution device.

9. A system for forming plastic preforms into plastic containers,
having a movable central carrier to which a plurality of devices according to claim 1 is attached.

10. A method for forming plastic preforms into plastic containers using a forming device with a first side part carrier and a second side part carrier, wherein a first side part of a blow mould is at least indirectly fastened to the first side part carrier and a second side part of the blow mould is at least indirectly fastened to the second side part carrier, wherein the first and second side parts form at least part of a cavity in a closed state of the blow mould within which the plastic preform is formed into the plastic container by being acted upon by a flowable medium, and wherein the forming device is arranged on a main carrier on which at least one side-part carrier is moved relative to the other side-part carrier in order to open and/or close the blow mould, wherein at least one element of the forming device being supplied by a supply device which has at least one first connecting line, wherein at least a section of at least one connecting line is arranged in a stationary manner with respect to the main carrier by at least one fastening device, and wherein a section of this connecting line is arranged on a device of the forming device in such a way that, when the side part carrier is moved relative to the main carrier, this section of the connecting line moves relative to the fastening device and/or the main carrier,
wherein
the apparatus has an actuator to which at least one section of the connecting line is fastened, wherein this actuator likewise moves relative to the main carrier when the blow mould is opened and/or closed.

11. The apparatus according to claim 2, wherein
the at least one connection line is a flexible connection line.

12. The apparatus according to claim 2, wherein
a movement of the actuator relative to the main carrier is coupled to a movement of at least one side part carrier relative to the main carrier.

13. The apparatus according to claim 12, wherein
the movement of the actuator is coupled to the movement of the side part carrier in such a way that said movement counteracts a change in distance between the side part carrier and the actuator.

14. The apparatus according to claim 2, wherein
at least one connecting line comprises a first connecting line section and a second connecting line section, wherein the first connecting line section and the second connecting line section being in flow communication with each other.

15. The apparatus according to claim 2, wherein the actuator is movable in a rectilinear direction.

16. The apparatus according to claim 2, wherein the actuator is also designed as a liquid distribution device.

17. The apparatus according to claim 3, wherein a movement of the actuator relative to the main carrier is coupled to a movement of at least one side part carrier relative to the main carrier.

18. The apparatus according to claim 17, wherein the movement of the actuator is coupled to the movement of the side part carrier in such a way that said movement counteracts a change in distance between the side part carrier and the actuator.

19. The apparatus according to claim 3, wherein at least one connecting line comprises a first connecting line section and a second connecting line section, wherein the first connecting line section and the second connecting line section being in flow communication with each other.

20. The apparatus according to claim 3, wherein the actuator is movable in a rectilinear direction.

\* \* \* \* \*